United States Patent
Nakajima et al.

(10) Patent No.: US 8,731,365 B1
(45) Date of Patent: May 20, 2014

(54) OPTICAL FIBERS

(71) Applicant: Furukawa Electric Co., Ltd., Tokyo (JP)

(72) Inventors: Yasuo Nakajima, Tokyo (JP); Hiroki Tanaka, Tokyo (JP); Kouji Mochizuki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/794,876

(22) Filed: Mar. 12, 2013

Related U.S. Application Data

(60) Division of application No. 12/770,807, filed on Apr. 30, 2010, now abandoned, which is a continuation of application No. PCT/JP2010/054436, filed on Mar. 16, 2010.

(30) Foreign Application Priority Data

Mar. 19, 2009 (JP) .................................. 2009-067156

(51) Int. Cl.
| | |
|---|---|
| *G02B 6/00* | (2006.01) |
| *G02B 6/02* | (2006.01) |
| *G02B 6/036* | (2006.01) |
| *C03B 9/00* | (2006.01) |
| *C03B 11/04* | (2006.01) |

(52) U.S. Cl.
USPC .............................. 385/141; 385/128; 65/73.1

(58) Field of Classification Search
USPC ......................................... 385/141, 144, 128
See application file for complete search history.

(56) References Cited

U.S. PATENT DOCUMENTS

| | | | |
|---|---|---|---|
| 7,729,564 | B2 | 6/2010 | Nakajima et al. |
| 7,876,991 | B2 | 1/2011 | Nakajima |
| 7,978,948 | B2 | 7/2011 | Nakajima |
| 2002/0168163 | A1 | 11/2002 | Szum et al. |
| 2002/0168164 | A1 | 11/2002 | Bishop et al. |
| 2003/0129397 | A1 | 7/2003 | Wilson et al. |
| 2006/0056790 | A1 | 3/2006 | Castellani et al. |
| 2008/0131062 | A1* | 6/2008 | Sendai et al. ................ 385/100 |

FOREIGN PATENT DOCUMENTS

| | | |
|---|---|---|
| JP | 09-005587 | 1/1997 |
| JP | 2004-198660 | 7/2004 |
| JP | 2006-113448 | 4/2006 |

(Continued)

OTHER PUBLICATIONS

Japanese Office Action mailed Nov. 20, 2012 issued in Japanese Patetn Application No. 2009-067156 (with English translation).

(Continued)

*Primary Examiner* — Ryan Lepisto
*Assistant Examiner* — Robert Tavlykaev
(74) *Attorney, Agent, or Firm* — Oblon, Spivak, McClelland, Maier & Neustadt, L.L.P.

(57) ABSTRACT

An optical fiber, which is less likely to increase its transmission loss even when it is exposed to a high-humidity environment or immersed in water, is provided. The optical fiber comprises a glass fiber and at least two coating layers (a soft layer and a hard layer) coated at the circumference of the glass fiber, wherein the limit-adhesion strength between the glass fiber and the coating layer under a hot and humid environment is 0.5N/10 mm or more. Preferably, the glass-transition temperature of the hard layer is less than 90° C.

3 Claims, 2 Drawing Sheets

(56) References Cited

FOREIGN PATENT DOCUMENTS

| JP | 2007-079603 | 3/2007 |
| JP | 2008-224744 | 9/2008 |
| WO | WO 2008/012926 A1 | 1/2008 |
| WO | WO 2008/029488 A1 | 3/2008 |

OTHER PUBLICATIONS

N. Akasaka et al. "Design of Optical Fiber Coating" Proc. of 19$^{th}$ Australian Conference on Optical Fiber Technology (ACOFT), pp. 375, 1994.

"Characterization and Qualification Report—IsoGain EDF" by Fibercore Limited, Jul. 2009.

* cited by examiner

OPTICAL FIBERS

CROSS-REFERENCES TO RELATED APPLICATIONS

The present divisional application claims the benefit of priority under 35 U.S.C. 120 to application Ser. No. 12/770,807, filed Apr. 30, 2010, which is a continuation application of International Application No. PCT/JP2010/054436, filed on Mar. 16, 2010, and claims the benefit of priority under 35 U.S.C. 119 from Japanese Application No. 2009-067156, filed on Mar. 19, 2009. The entire contents of application Ser. No. 12/770,807, PCT/JP2010/054436, and 2009-067156 are hereby incorporated by reference herein.

BACKGROUND OF THE INVENTION

1. Technical Field

The present invention relates to water-resistant optical fibers.

2. Background of the Invention

Typically, an optical fiber comprises a glass fiber, made from silica; and a coating at the circumference of the glass fiber, made from a coating resin. The coating prevents strength reduction. An ultraviolet-curable resin, particularly a urethane-acrylate type or an epoxy-acrylate type, is generally used as the coating resin for the optical fiber.

An optical fiber increases its transmission loss due to external stress and microbending caused by such external stress. To protect the optical fiber from such external stress, the optical fiber is usually coated with two layers (a soft layer and a hard layer) of material. For the inner layer, which directly contacts with the silica glass, a soft resin with low Young's modulus is used as a buffer layer (hereafter a primary layer); and for the outer layer, a hard resin with high Young's modulus is used as a protective layer (hereafter a secondary layer). Conventionally, a resin with 3 MPa or less in Young's modulus is used as the primary layer, and a resin with 500 MPa or more in Young's modulus is used as the secondary layer.

Such optical fibers are manufactured by the following process. First, a glass fiber is drawn from a silica glass preform by heating the preform in a drawing furnace. Then immediately afterward, a liquid ultraviolet-curable resin is coated onto the drawn silica fiber via a coating die and cured with ultraviolet light. The primary and secondary layers are created by this process. There are methods for coating the primary and secondary layers at the same time, and then simultaneously curing both; and there are methods for coating and curing the secondary layer after the primary layer has been coated and cured.

As the popularity of optical fibers is growing in recent years, the number of optical fiber cable applications is increasing. Because of the popularity, the environments where optical fiber cables are used have been diversified, and the long-term reliability required for optical fiber cables becomes stricter. With the situation as stated above, an optical fiber, which is less likely to increase its transmission loss when it is immersed in water for long period of time, is being considered. For example, Japanese Patent Application Laid-open No. 09-005587, discloses an optical fiber, which does not increase its transmission loss even when it is immersed in water for long periods of time due to strengthened adhesion between the primary layer and the glass fiber.

It is known that in an optical fiber, which increases its transmission loss when it is exposed to a high-humidity environment or immersed in water, delamination is observed in the boundary layer between the coating layer and the glass fiber. Delamination between the coating layer and the glass fiber occurs when the force applied to peel off the coating layer in a boundary face between the glass fiber and the coating layer is greater than the boundary face adhesive force between the glass fiber and the coating layer. When delamination occurs at the boundary face between the glass fiber and the coating layer, a force applied to the glass fiber becomes uneven. The unevenness in the force causes microbending and consequently the optical fiber increases its transmission loss.

The mechanism that causes the adhesive force between the glass fiber and the coating layer to be reduced when the optical fiber is immersed in water is inferred as follows. When the optical fiber is immersed in water or exposed to a high-humidity environment, moisture passes through the coating layer and reaches the boundary face between the glass fiber and the coating layer. Adhesive force exists at the boundary face between the glass fiber and the coating layer and, in general, comprises hydrogen bonds between glass fiber and a functional group in a resin, and chemical bonds from an adhesion accelerator (see for example, N. Akasaka et al., "Design of Optical Fiber Coating", Proc. of 19th Australian Conference on Optical Fibre Technology (ACOFT), p. 375, 1994). However, it is believed that the hydrogen bonds are disconnected when water penetrates the boundary face between the glass fiber and the coating layer. As stated above, it is inferred that the adhesive force at the boundary face between the glass fiber and the coating layer is reduced by the disconnection of the hydrogen bonds.

Various optical fibers, which were less likely to increase their transmission loss when immersed in water, have been proposed. However, as shown in Japanese Patent Application Laid-open No. 09-005587, known methods to suppress transmission-loss increase by balancing the adhesive property of each boundary layer have limitations and these methods do not offer sufficient reliability.

With the situation as stated above, the purpose of the present invention is to provide an optical fiber, which suppresses its transmission-loss increase due to environmental or age deterioration, particularly when it is exposed to a high-humidity environment or is immersed in water.

SUMMARY OF THE INVENTION

To solve the problem stated above, an optical fiber according to the present invention comprises a glass fiber having at least two layers (a soft layer and a hard layer) coated around its circumference; wherein the limit-adhesion strength between the glass fiber and the soft layer, in a hot and humid environment, is 0.50N/10 mm or more.

Also, in the optical fiber according to the present invention, the glass-transition temperature of the hard layer is equal to or less than 90° C. and an amount of silane coupling agent is equal to or larger than 0.5 wt %.

BRIEF DESCRIPTION OF THE DRAWINGS

Referring now to the drawings.

DETAIL DESCRIPTION

Figure 1:
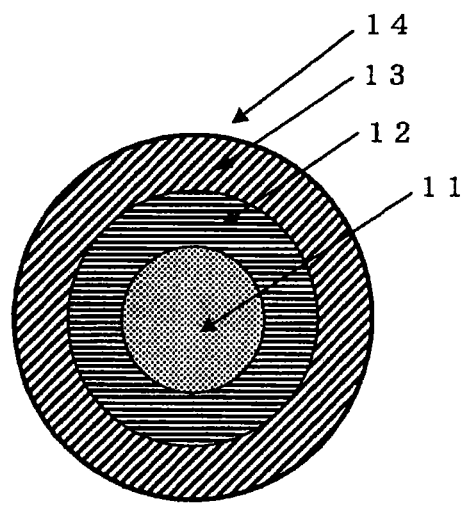
FIG. 1 is a cross-sectional view of an optical fiber as an embodiment of the present invention.

Below, modes of optical fibers according the present invention are explained in detail using figures. However, the invention is not limited to the embodiment disclosed herein. FIG. 1 is a cross-sectional view of an optical fiber 14 as an embodiment of the present invention. As shown in FIG. 1, this optical fiber 14 comprises a glass fiber 11; a soft primary layer 12; and a hard secondary layer 13; wherein both of the layers are coated around the circumference of the glass fiber 11.

An ultraviolet-curable resin used as a coating resin for the primary and secondary layers of the optical fiber mainly comprises an oligomer, a diluent monomer, a photoinitiator, a chain transfer agent, a silane coupling agent, and other additive agents. As for the oligomer, a urethane-acrylate type, an epoxy-acrylate type or a polyester-acrylate type, is mainly used. As for the diluent monomer, a mono-functional acrylate or a multi-functional acrylate is mainly used. As silane coupling agent, mercaptopropyltrimethoxysilane, methacryloxytrimethoxysilane and aminopropyltrimethoxysilane or combination of them are available.

The optical fiber 14 has a limit-adhesion strength, between the glass fiber and the coating layer in a hot and humid environment, of 0.50N/10 mm or more, and therefore it prevents its transmission loss from increasing when the fiber is exposed to a high-humidity environment or immersed in water. The value of the limit-adhesion strength between the glass fiber and the coating layer in a hot and humid environment is measured according to the following method.

Figure 2:
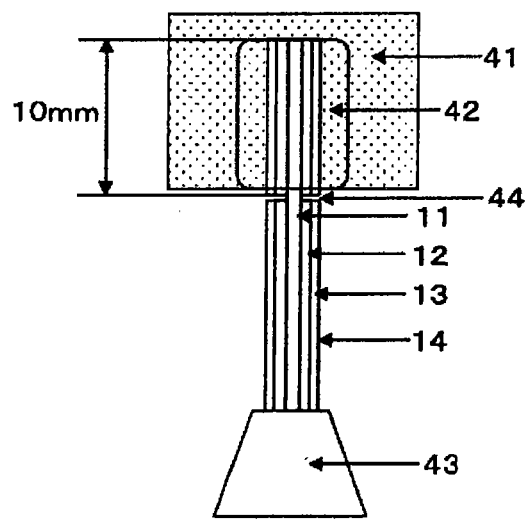
FIG. 2 is a diagram to show one of the methods to measure the limit-adhesion strength.

Details regarding the method of measuring the limit-adhesion strength are explained using FIG. 2. First, approximately 30 cm of the optical fiber 14 is provided. Then, a cut 44 is made around the primary layer 12 and the secondary layer 13 on the fiber, which is approximately 5 cm away from one end of the fiber. Next, an upper side part with respect to cut 44 of the optical fiber 14 is fixed on a sand paper 41 using an adhesive agent 42. Then, the optical fiber 14 is cut to have 10 mm distance between the cut 44 and the upper end of the fiber, which attached to the sand paper 41.

The sample created by using above steps is subjected to a testing environment (600C temperature and 98% RH humidity) so that the side with the sand paper 41 attached is facing up. Then, a weight 43 is attached to the lower end of the optical fiber 14. Accordingly, a constant load is applied to the boundary face between the glass fiber 11 and the primary layer 12 above the cut 44 of 10 mm portion. Under these conditions, time is measured until the glass fiber 11 is pulled out from the coating layer. The pull-out time depends on a deterioration of adhesion strength at an interface between the optical fiber 14 and primary layer 12 when moisture reaches the interface. Then, the loading (i.e. mass of the weight 43) is gradually changed to observe the relationship between the loading and the time taken for the glass fiber 11 to be pulled out.

Figure 3:
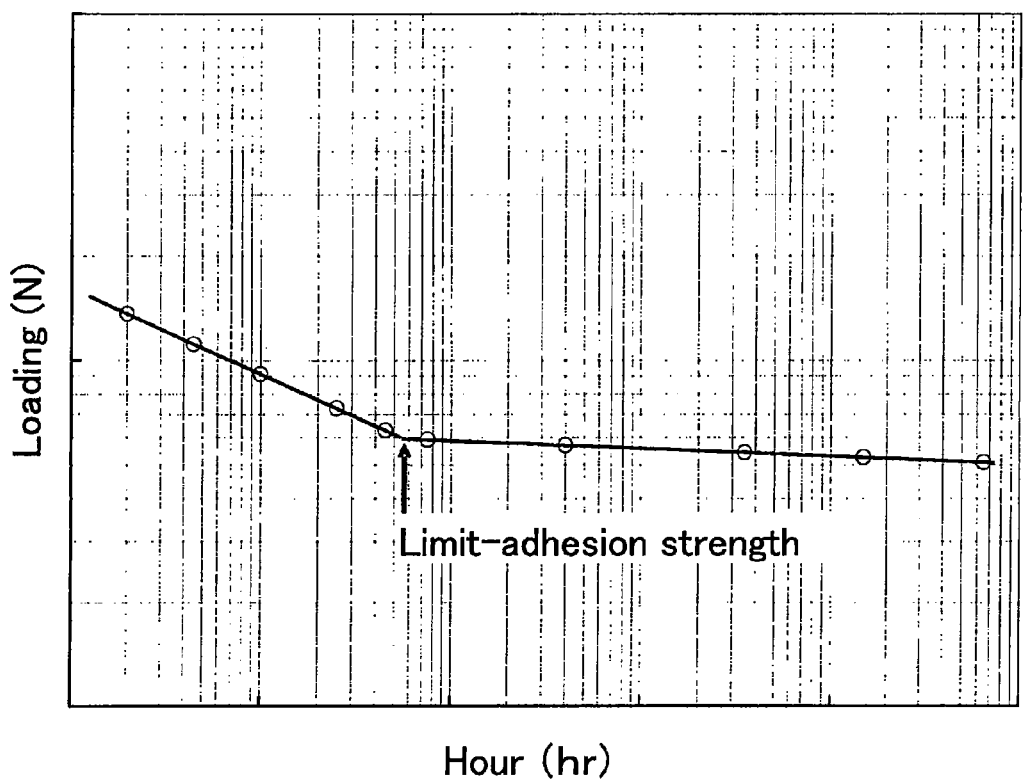
FIG. 3 is a typical chart for the result of the limit-adhesion strength in a measurement.

FIG. 3 is a chart showing typical measurement results of the limit-adhesion strength. When the loading (i.e. mass of the weight 43) between the glass fiber 11 and the primary layer 12 is gradually reduced, the time taken for the glass fiber 11 to be pulled-out increases. However, when the load is reduced to a specific loading amount, the time taken for the glass fiber 11 to be pulled out suddenly becomes longer and the slope of the curve becomes sharply reduced. The loading at the inflection point where the slope of the curve is sharply reduced is referred to as the limit-adhesion strength.

The inventors of the present invention are the first ones to discover the inflection point where the time taken for the glass fiber 11 to be pulled-out suddenly becomes longer under certain loading or less when a static loading is applied between the glass fiber and the coating layer. The inflection point (i.e. limit-adhesion strength) has high correlation with the transmission loss increase when the moisture reaches to the boundary face between the glass fiber and coating layer. It is assumed that the limit-adhesion strength between the glass fiber and coating layer is a type of adhesion strength, which is rarely dependent on speed. Furthermore, the limit-adhesion strength in a hot and humid environment is assumed to show adhesion strength between the glass fiber and the coating layer when moisture reaches the boundary of the glass fiber and the coating layer. That is, an increase of transmission loss due to peeling at the boundary can be prevented by maintaining a high adhesive strength when moisture reaches the boundary.

Embodiments

Below, embodiments and comparative examples are shown to explain the optical fibers according the present invention in detail. Several kinds of optical fibers, which are made by coating the glass fiber 11 with two layers of the coating layer (the primary layer 12 and the secondary layer 13) as shown in FIG. 1 are manufactured. For each coating, an ultraviolet-curable resin is used. The ultraviolet-curable resin used as a coating resin mainly comprises an oligomer, a diluent monomer, a photoinitiator, a chain transfer agent and an additive; however, the compositions are changed for each fiber. In addition, the limit-adhesion strength can be changed arbitrary by the structure of the oligomer, the molecular weight of the oligomer, the category of the diluent monomer, the amount of the diluent monomer, and additives such as surface modifying agents. For example, the glass-transition temperature of the secondary layer can be reduced by increasing the molecular weight of the polyol used for the oligomer skeletal structure use or by reducing the compounding ratio of the diluent monomer used; and therefore, the limit-adhesion strength increases. Also, with regard to the primary material, a surface-modifying agent such as a silane coupling agent can be added to increase the limit-adhesion strength.

The type of the optical fiber disclosed is a standard single mode optical fiber, which has a zero-dispersion wavelength at about 1300 nm. The outer diameter of the glass fiber 11 is 125 μm, the outer diameter of the primary layer 12 is 195 μm, and the outer diameter of the secondary layer 13 is 245 μm. In embodiment 1 to 6, a mercaptopropyltrimethoxysilane is used for silane coupling agent. In embodiment 7, 0.3 wt %-mercaptopropyltrimethoxysilane and 0.2 wt %-methacryloxytrimethoxysilane are used.

In a fiber drawing step, the coated resin is heated over 100° C. by exothermic reaction during UV curing and then cooled to a room temperature. At the course of cooling to the room temperature, since the glass transition temperature of the primary layer is lower than 0° C. and the glass transition temperature of the secondary layer is normally over 60° C., the secondary layer only can become the glass state from a rubber state. The thermal expansion coefficient in the rubber state is about three times that in the glass state. Accordingly, when the coated resin is cooled lower than the glass transition temperature, the secondary layer is transformed into the glass state and the thermal expansion coefficient becomes small, but the primary layer retains the rubber state and is shrunk with the high thermal expansion coefficient which is about three times that of the secondary layer. As a result, the shrinkage of the primary layer produces a force of pulling the secondary layer. If the shrinkage due to the difference in the glass transition temperature becomes smaller when the glass transition temperature of the secondary layer is low, the pulling force becomes will weak. When the pulling force is weak, a force of constricting the glass fiber increases, a force required to pull out the glass fiber becomes higher. This results in an improvement for limit-adhesion strength. Through an appropriate combination of a selected amount of silane coupling agent in the primary layer and a sealed glass transition temperature of the secondary layer, an improved transmission loss was realized.

The glass-transition temperature of the secondary layer, the limit-adhesion strength, and transmission loss under water are measured for various optical fibers.

Method to Measure Transmission Loss

The optical fibers of approximately 1 km in length are immersed in 60° C. water. Then, by setting the transmission loss before they are immersed in water as a default value, the transmission-loss increase is measured 30 days and 60 days later. An optical pulse testing device MW9060A from the Anritsu company is used to measure the increase in transmission loss. A backscattering coefficient (OTDR) method is used at a wavelength of 1.55 p.m. If the increase in transmission loss after 30 days of immersion in 60° C. water is more than 0.1 dB/km, then the fiber is deemed to have insufficient resistance properties (and marked as "poor:" in Table 1). Furthermore, if the increase in transmission loss after 30 days of immersion in 60° C. water is less than 0.1 dB/km, then the fiber is deemed to have sufficient resistance properties (and marked as "good" in Table 1). In addition, if the increase in transmission loss after 60 days of immersion in 60° C. water is less than 0.1 dB/km, then the fiber is deemed to have superior resistance properties (and marked as "very good" in Table 1). Moreover, if increase in the transmission loss is less than 0.1 dB/1 cm, then it does not create any additional issue in actual use.

Measurement of the Glass-Transition Temperature of the Secondary Layer

For the glass-transition temperature of the secondary layer, the temperature that exhibits maximum loss tangent value using a dynamic viscoelastic device for the coating layer of the optical fiber is considered to be its glass-transition temperature. For the measurement samples of the coating layer, a tube-shaped coating layer, which is obtained by pulling the glass fiber from the optical fiber in liquid nitrogen, is used as a sample. Also, if the glass fiber is not removed from the optical fiber, then a chip off of the coating layer can be used as a sample. The conditions for dynamic viscoelastic experiments are set at 1 Hz and 2° C./minute.

TABLE 1

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Primary layer Young's modules (MPa) | 0.9 | 0.8 | 0.8 | 0.8 | 0.8 | 0.8 | 0.9 | 0.9 | 0.9 | 0.8 |
| Secondary layer Young's modules (MPa) | 600 | 600 | 800 | 800 | 800 | 600 | 600 | 800 | 600 | 800 |
| Primary layer outer diameter (μm) | 195 | 195 | 195 | 195 | 195 | 195 | 195 | 195 | 195 | 195 |
| Amount of silane coupling agent (wt %) | 0.5 | 1 | 1 | 2 | 2 | 2 | 0.5 | 0.5 | 0.5 | 1 |
| Glass transition temperature of the secondary layer (° C.) | 75 | 75 | 90 | 90 | 115 | 75 | 75 | 90 | 115 | 115 |
| Limit-adhesion strength (N) | 0.5 | 0.6 | 0.55 | 0.73 | 0.73 | 0.93 | 0.50 | 0.45 | 0.4 | 0.45 |
| Transmission loss increase (dB/km) in 60° C. water for 30 days at 1550 nm | 0.08 | 0 | 0.08 | 0 | 0 | 0 | 0.09 | 0.2 | 0.28 | 0.12 |
| Transmission loss increase (dB/km) in 60° C. water for 60 days at 1550 nm | 0.4 | 0.08 | 0.35 | 0.05 | 0.2 | 0.05 | 0.45 | 0.5 | 0.7 | 0.5 |
| Test results | good | very good | good | very good | good | very good | good | poor | poor | poor |

As shown in the Table 1, embodiments 1-6 have a limit-adhesion strength of more than 0.50N/10 mm and increase their transmission loss by 0.1 dB/km or less after the fibers are immersed in 60° C. water for 30 days. Also, embodiments 2, 4 and 6 have a limit-adhesion strength of more than 0.60N/10 mm and increase their transmission loss by 0.1 dB/km or less after the fibers are immersed in 60° C. water for 60 days. On the other hand, comparative examples 1-3 have a limit-adhesion strength of less than 0.50N/10 mm and increase their transmission loss by 0.1 dB/km or more after the fibers are immersed in 60° C. water for 30 days.

In the present embodiments, standard single mode fibers with zero dispersion wavelengths at about 1300 nm are used. However, the present invention can be applied to other types of optical fibers as well.

Furthermore, there are fibers that include colorant in their secondary material, and coatings made from a colorant resin can be applied at the circumference of the optical fiber to make colored optical fiber. Also, multiple optical fibers can be placed in a planar array and bound together with a ribbon resin to make an optical fiber ribbon. Nevertheless, the value of the limit-adhesion strength is the same for optical fibers, colored optical fibers, optical fiber ribbons, and optical fibers separated from the optical fiber ribbon; and it has the same effect in all of the fibers mentioned above. Table 1 shows that, under a condition of secondary layer-glass transition temperature equal to or less than 90° C. and an amount of silane coupling in the primary layer equal to or larger than 0.5 wt %, a desirable transmission loss characteristics can be obtained.

The invention claimed is:

1. An evaluation method for an optical fiber which includes a glass fiber and a coating layer coated at a circumference of the glass fiber, the evaluation method comprising:

measuring a limit-adhesion strength which is a loading at an inflection point in a relationship between a given loading to pull out the glass fiber from the coating layer and a time taken for the glass fiber to be pulled out from the coating layer by the given loading, and evaluating a water-resistance of the optical fiber in accordance with the limit-adhesion strength.

2. The evaluation method of claim 1, wherein the relationship between the given loading and the time is measured by providing a sample which is cut out of the optical fiber, making a cut around the coating layer at a predetermined position away from one end of the sample, fixing a region of the sample from the one end to the cut, and applying the given loading to the other end of the sample.

3. The evaluation method of claim 2, wherein the evaluating includes determining that the water-resistance is good when the limit-adhesion strength is 0.50 N/10 mm or more under a condition that the limit-adhesion strength is measured in an environment of 60° C. and 98% RH humidity and the predetermined position where the cut is made is 1 cm away from the one end of the sample.

* * * * *